(No Model.)
C. F. STONER & J. M. MARTIN.
FLY NET HOLDER.
No. 562,983. Patented June 30, 1896.
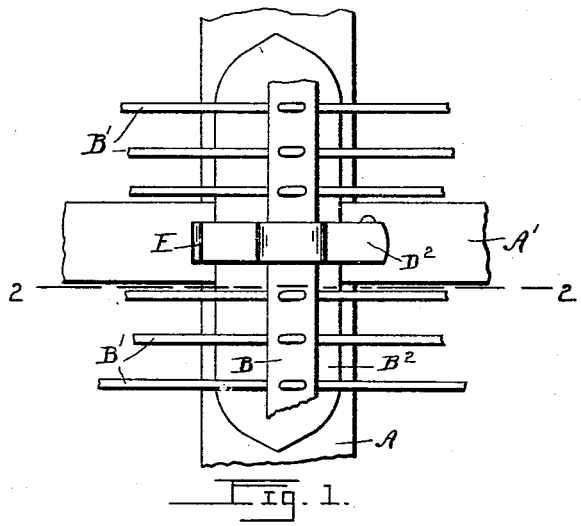
Fig. 1.
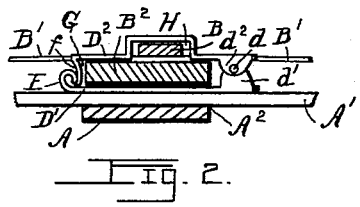
Fig. 2.
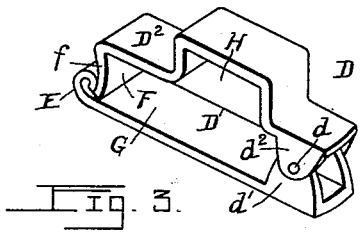
Fig. 3.
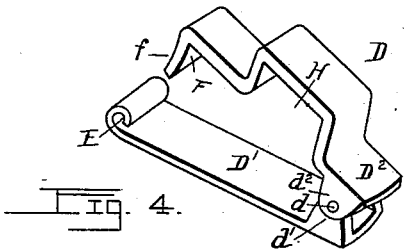
Fig. 4.
Fig. 5.      Fig. 7
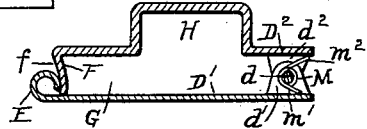
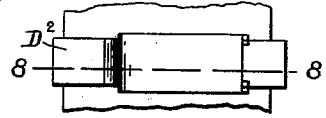
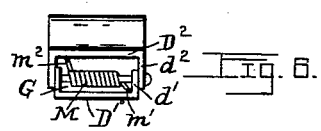
Fig. 6.
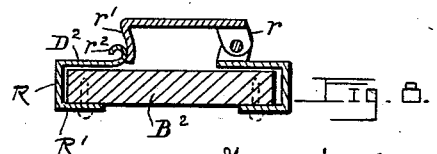
Fig. 8.
Witnesses:
W. M. Hall.
C. G. Bassler
Inventors
Christian F. Stoner.
Jacob M. Martin.
By Attorney
Wm. R. Gerhart
ANDREW B. GRAHAM. PHOTO-LITHO. WASHINGTON, D.C.

UNITED STATES PATENT OFFICE.

CHRISTIAN F. STONER AND JACOB M. MARTIN, OF LANCASTER, PENNSYLVANIA.

FLY-NET HOLDER.

SPECIFICATION forming part of Letters Patent No. 562,983, dated June 30, 1896.

Application filed November 5, 1895. Serial No. 568,031. (No model.)

*To all whom it may concern:*

Be it known that we, CHRISTIAN F. STONER and JACOB M. MARTIN, citizens of the United States, residing at Lancaster, in the county of Lancaster, State of Pennsylvania, have invented certain Improvements in Fly-Net Holders, of which the following is a specification.

This invention relates to improvements in that class of nets used on horses to protect them from flies and other insects; and the objects of the invention are, first, to provide a fly-net holder simple and cheap in construction, and which will detachably, but securely, hold the net in proper position on the rump of an animal, and, second, to provide a separate or independent channel through which a member of the fly-net may pass, so that said member may have a longitudinal movement therein independently of the movement of the member of the harness to which it is secured.

In the fly-net holders now in use the back-strap of the net is immovably clamped to the back-strap of the harness, and as the net is secured in front to the collar and the back-strap of the harness only extends to the saddle the movements of the animal's head and neck pull only on the net, tending to stretch and tear the same where it is caught by the holder and to disarrange the set of the harness. This difficulty is overcome in our invention by providing a separate and distinct channel through which only the back-strap of the fly-net passes and in which it is free to move longitudinally.

The invention consists in the construction and combination of the various parts, as hereinafter fully described, and then pointed out in the claims.

In the accompanying drawings, which form a part of this specification, Figure 1 is a top plan view of the rear end of the back-strap of a set of harness, illustrating a fly-net secured thereto by a holder embodying our invention. Fig. 2 is a transverse section on broken line 2 2, Fig. 1, the holder being shown in an open position by broken lines. Fig. 3 is an enlarged perspective view of the holder detached and closed; and Fig. 4 a similar view, but showing the holder open. Fig. 5 is a longitudinal section of the holder detached, and Fig. 6 a view of the hinged end of the holder. Fig. 7 is a top plan view of a modified form of the holder, and Fig. 8 a vertical section thereof on broken line 8 8.

Similar letters indicate like parts throughout the several views.

Referring to the details of the drawings, A indicates the back-strap of the harness; A', the breeching-straps; $A^2$, the slot on the back-strap through which the breeching-strap passes; B, the back-strap of the fly-net, and B' the cross-strips of the net.

D indicates the holder, comprising a lower leaf D' and an upper leaf $D^2$. On the sides of one end of the lower leaf D' are upwardly-extending lips d', and on the sides of the corresponding end of upper leaf $D^2$ are depending lips $d^2$, that lap the outer faces of lips d'; and through these lips d' $d^2$ the leaf $D^2$ is movably connected with leaf D' by a hinge pin or rod d.

The vibrating end of leaf D' is turned up and curled backward on itself, so as to form a scroll or curved catch E; and the corresponding end of leaf $D^2$ is bent downward and forms a spring-tongue F, constructed to engage catch E and secure the vibrating ends of the leaves together. Tongue F flares outward, and its outer face is transversely somewhat concave, as shown at *f*, so as to adapt it more closely to the curved outline of catch E, that it may take a better hold thereon. The depth of tongue F and the lips d' $d^2$, with the location of hinge-rod d, is such that between lower leaf D' and the ends of upper leaf D is left a channel G, through which passes the strap $B^2$, secured to back-strap B of the harness to form the slot $A^2$, through which the breeching-strap A' passes.

The center of leaf $D^2$ is struck up to form a rectangular channel H in the under side thereof, narrower than, but opening into, channel G; and the leaf D² is actuated to close upon leaf D' by a spring M, coiled around hinge-rod $d$, and having one end, $m'$, bearing on the heel of leaf D' and the other end, $m^2$, on the heel of leaf D², the heels of these leaves being extended back behind hinge-rod $d$ to give bearings for the ends of the spring and to afford a grip, whereby spring-tongue F may be detached from catch E to open the holder. By striking up only the central portion of leaf D² shoulders are formed on the ends of said leaf; and these shoulders, when leaf D² is closed, clamp the holder upon strap B², the back-strap of the fly-net being free to move longitudinally through channel H of said leaf.

In applying the holder, the leaf D' is passed through slot A², between strap B² and back-strap A, in which position the hinged end of leaf D' projects beyond the edges of said straps on one side and the vibrating end thereof on the other side. The back-strap B of the fly-net is then laid lengthwise on the back-strap A of the harness in position to be embraced by channel H of leaf D². Said leaf is then closed over the back-strap and the spring-tongue F is engaged with catch E. The parts then being in their normal positions, the strap B² of the harness passes through channel G and the back-strap B of the fly-net through channel H. To release the fly-net, or to entirely detach the holder from the harness, the spring-tongue is released from catch E.

As will be observed, the parts comprising the holder are few in number and simple in construction, and the construction and the mode of attaching the holder renders its application easy and its action efficient.

In Figs. 7 and 8 is illustrated a modified form of holder, in which leaf D' is omitted and its place supplied by inturned clip-forming ends R, preferably made L-shaped, the vertical members of which are formed integral with the outer ends of leaf D² and the horizontal members R' extended beneath said leaf, spaces being made to intervene said members and the under face of said leaf D². In this construction, as in that first described, leaf D² extends over strap B², but both ends of said leaf are secured directly to the harness, preferably to strap B², through clip-forming ends R. The part forming the channel H, however, is not formed with or rigidly attached to leaf D², but has one of its sides, $r$, pivoted or hinged to the leaf and the other side, $r'$, formed as a spring-tongue, similar to tongue F, and adapted to engage a catch $r^2$ on leaf D², so that in securing the back-strap of the fly-net the channel itself is opened, not the leaf D². The leaf D² may be detachably or permanently attached to the harness in any well-known manner.

We do not limit ourselves to any particular way of hinging or securing the vibrating parts of the first or the modified form of the device herein described; neither do we restrict ourselves to the other details of construction and arrangement of parts herein shown and described.

Our improvement involves a radical departure in the construction and principle of operation in fly-net holders, the invention consisting, broadly, in a device having a channel therein only adapted to receive or take over a member of said net.

Having thus described our invention, what we claim as new, and desire to secure by Letters Patent, is—

1. A fly-net holder comprising a device constructed to engage beneath a member of a harness, a shoulder engaging the upper surface of said member of the harness, and an offset adjacent to said shoulder forming a separate channel constructed to take over a member of a fly-net, said channel being adapted to be opened to receive the member of the fly-net.

2. A fly-net holder comprising a device constructed to engage beneath a member of a harness, shoulders engaging the upper surface of said member of the harness, and an offset in the holder between said shoulders, forming a separate channel constructed to take over a member of a fly-net, said channel being adapted to be opened to receive the member of the fly-net.

3. A fly-net holder comprising a stationary leaf adapted to take beneath a member of a harness, a vibrating leaf hinged at one end to the stationary leaf and having the other end constructed to be detachably connected with the free end of said stationary leaf, a shoulder on the vibrating leaf constructed to bear upon the member of the harness, and an offset formed adjacent to said shoulder in the vibrating leaf, forming a channel adapted to embrace a member of the fly-net, for the purpose specified.

4. A fly-net holder comprising a stationary leaf adapted to take beneath a member of a harness, a vibrating leaf hinged at one end to the stationary leaf and having the other end constructed to be detachably connected with the free end of said stationary leaf, shoulders on the vibrating leaf constructed to bear upon the member of the harness, and an offset between said shoulders, forming a channel adapted to embrace a member of the fly-net, for the purpose specified.

5. A fly-net holder comprising a stationary leaf adapted to take beneath a member of a harness, a spring-actuated vibrating leaf hinged at one end to the stationary leaf and having the other end constructed to be detachably connected with the free end of said stationary leaf, a shoulder on the vibrating leaf constructed to bear upon the member of the harness, and an offset in the vibrating leaf, forming a channel adapted to embrace a member of the fly-net, for the purpose specified.

6. A fly-net holder comprising a stationary leaf adapted to take beneath a member of a harness, a vibrating leaf, inwardly-projecting lips on the sides of corresponding ends of the leaves, the lips of one leaf lapping those of the other, a hinge-pin passing through the lapping lips, a spring coiled around the hinge-pin and having its opposite ends bearing against the opposite leaves, shoulders on the vibrating leaf constructed to bear upon the member of the harness, and an offset between said shoulders, forming a channel adapted to embrace a member of a fly-net, for the purpose specified.

C. F. STONER.
J. M. MARTIN.

Witnesses:
A. F. SHENCK,
WM. R. GERHART.